US008324500B2

(12) United States Patent
Belyea et al.

(10) Patent No.: US 8,324,500 B2

(45) Date of Patent: Dec. 4, 2012

(54) OUTLET COVER

(75) Inventors: Vianka Perez Belyea, Boston, MA (US); Tavinder Phull, Newton, MA (US)

(73) Assignee: Rhoost LLC., Newton, MA (US)

( * ) Notice: Subject to any disclaimer, the term of this patent is extended or adjusted under 35 U.S.C. 154(b) by 246 days.

(21) Appl. No.: 12/795,333

(22) Filed: Jun. 7, 2010

(65) Prior Publication Data

US 2011/0300729 A1 Dec. 8, 2011

(51) Int. Cl.
*H02G 3/14* (2006.01)

(52) U.S. Cl. ............. 174/66; 174/67; 439/142; 220/241

(58) Field of Classification Search .................... 174/66, 174/67; 220/241, 242; 439/135, 142
See application file for complete search history.

(56) References Cited

U.S. PATENT DOCUMENTS

| | | | | |
|---|---|---|---|---|
| 6,051,788 | A * | 4/2000 | Nichols | 174/67 |
| 6,674,003 | B1 * | 1/2004 | Torres | 174/66 |

* cited by examiner

*Primary Examiner* — Dhirubhai R Patel
(74) *Attorney, Agent, or Firm* — Wilmer Cutler Pickering Hale & Dorr LLP.

(57) ABSTRACT

An electrical outlet safety cap is easily removed from an electrical outlet by adults but not by children. The safety cap includes a disk, prong or prongs, and at least one keyhole. The prongs extend outwardly from the rear surface of the disk. When in place, the prongs are secured tightly in the contact holes to prevent removal by children. The rear surface of the disk has one or more keyholes. To remove the safety cap, the prong of a second safety cap is slid into the keyhole of a first safety cap that is in use. The second safety cap is pulled outward, away from the electrical outlet, removing the prongs of the first safety cap from the contact holes to free the first safety cap from the electrical outlet.

19 Claims, 3 Drawing Sheets

OUTLET COVER

BACKGROUND

Outlet covers or safety caps are used to reduce hazard to small children from shock and electrocution. Electrical outlets are usually installed at or near a child's eye level, drawing the attention of curious children. As many as 890 deaths occur each year from electrocution. According to one study, 86% of reported injuries caused by shock and electrocution involve children one to four years of age.

Safety caps are usually configured to lie flush against the plate surrounding the contact holes of an electrical outlet to prevent small children from placing objects in the contact holes, and to prevent them from removing the safety caps. However, safety caps are often difficult to remove, even for adults. This inconvenience may cause adults not to use safety caps as often as they would otherwise, exposing small children to risk of shock and electrocution. Other safety caps are configured with tapered sides or with raised edges surrounding the disk of the cap. These types of safety caps make it easier for adults to remove the safety caps, but also make it simpler for small children to remove them.

SUMMARY

Disclosed is a safety cap, which is easily removed by adults, having a disk, one or more prongs, and one or more keyholes. The prong or prongs extend outwardly from the rear surface of the disk. When in place, the rear surface of the disk is in contact with the exterior surface of the electrical outlet and the prongs are secured tightly in the contact holes of the electrical outlet. The prongs are configured to provide sufficient resistance to removal from contact holes by children. The rear surface of the disk has one or more keyholes, which are configured to slidably couple with a device having a prong-sized projection, such as a second safety cap, for removal. To remove the safety cap, the prong of a second safety cap is slid into the keyhole of a first safety cap while the first safety cap is in use in an electrical outlet. The second safety cap is pulled outward, away from the electrical outlet, removing the prongs of the first safety cap from the contact holes to free the first safety cap from the electrical outlet.

BRIEF DESCRIPTION OF THE DRAWINGS

The foregoing and other objects of the present inventions, the various features thereof, as well as the inventions themselves, may be more fully understood from the following description, when read together with the accompanying drawings, in which.

DETAILED DESCRIPTION

Figure 1:
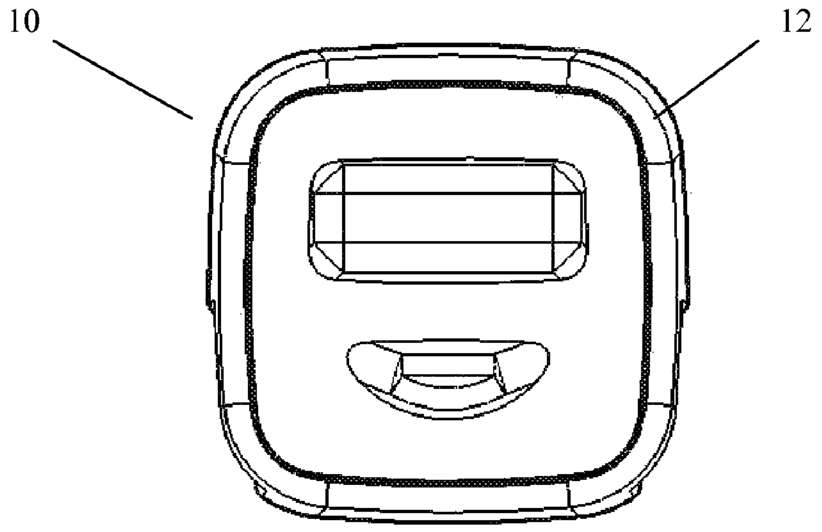
FIG. 1 is a front view of the safety cap.

Referring to FIG. 1, this description relates to a safety cap 10 for covering electrical outlets to reduce hazard to small children from electrocution and shock. The safety cap 10 can be easily removed by adults using a second safety cap. The safety cap 10 has a disk 12 with a front surface that faces out, and a rear surface that contacts the exterior surface of an electrical outlet. The disk 12 is configured to cover the area of the electrical outlet immediately surrounding the contact holes of the electrical outlet. When the safety cap 10 is in place, it prevents insertion of any other object into the contact holes.

Figure 2:
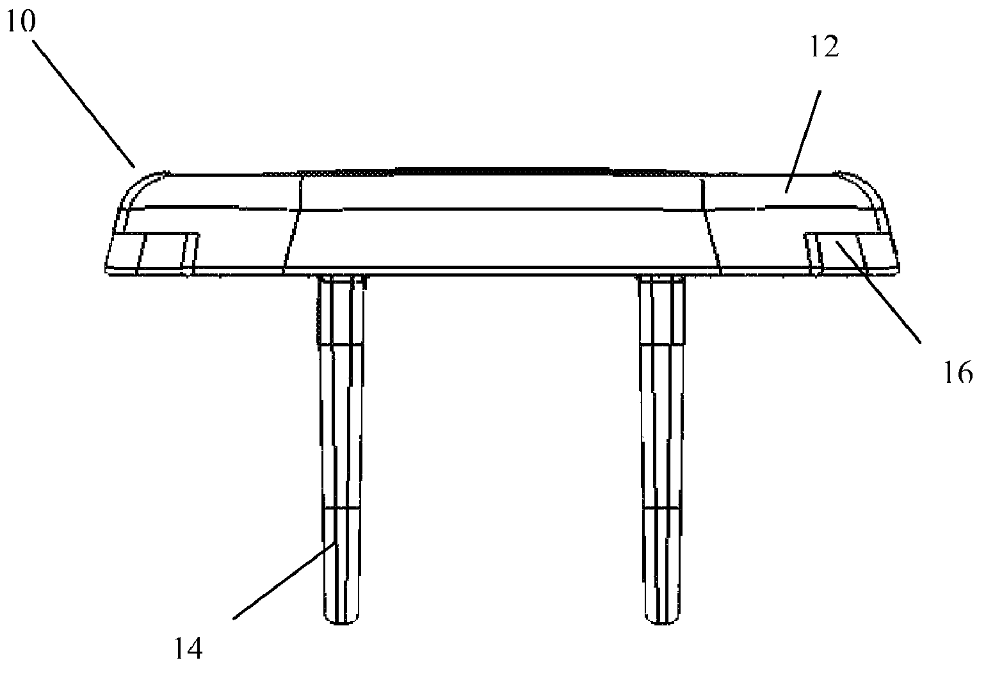
FIG. 2 is a bottom view of the safety cap.
Figure 3:
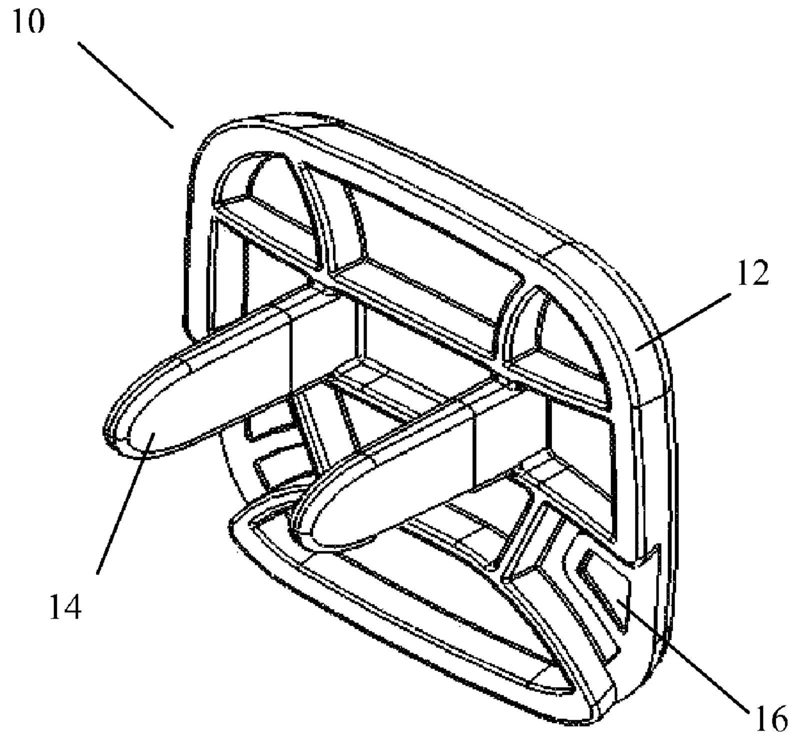
FIG. 3 is a perspective view of the safety cap.

Referring also to FIGS. 2 and 3, removal of the safety cap 10 is simplified by having keyholes 16 on the rear surface of the safety cap 10. The keyholes 16 are configured to allow a device having a prong-sized projection to slide into the keyhole 16 of a safety cap 10 that is already in place in an electrical outlet. In one embodiment, the prong-shaped device is a second safety cap. The first safety cap 10 is removed with the second safety cap by sliding the prong 14 of the second safety cap into the keyhole 16 of the first safety cap 10 and pulling outward. There can be one, two, or more keyholes 16 on the interior-facing side of the safety cap 10. They can be oriented on the top, bottom, or sides of the disk 12 (as oriented in FIG. 1).

The safety cap 10 has a plurality of prongs 14 that fit into the contact holes of an electrical outlet. The prongs 14 extend outwardly from the rear surface of the disk 12. The prongs 14 are shaped to fit the contact holes of the electrical outlet into which they are placed. Moreover, the prongs 14 are configured to be held tightly by the contact holes and to provide sufficient resistance to removal from the contact holes by children. The shape of the prongs 14 varies depending on the type of outlet the safety cap 10 is used to cover. For example, the prongs 14 can be two blade-like prongs to fit the contact holes found on a standard North American outlet, or there can be three that are cylindrical to fit the contact holes found on European outlets.

The edges of the disk 12 of the safety cap 10, with the exception of the notches on the interior-facing side of the safety cap 10 for the keyholes 16, can lie flush against the surface of the electrical outlet. Alternatively, the safety cap 10 can have raised edges that protrude away from the surface of the electrical outlet.

The safety cap 10 is made of, or coated with, an electrically non-conductive material including, but not limited to plastic, rubber, rubber-like polymers, or nylon. A phosphorescent material can be used to make or coat the safety cap 10 so that when activated by light or heat, the safety cap 10 emits a glow of light in low-light and dark environments for ease of seeing the safety cap 10 in the dark. The phosphorescent material can be mixed with electrically non-conductive materials to make or coat the safety cap 10.

As shown in FIG. 3, the keyholes can be channels that extend partially inwardly from the periphery of safety cap 10 (as shown) or extend all the way across the back of the safety cap 10.

For convenience, certain terms employed in the specification, examples, and appended claims are collected here. Unless defined otherwise, all technical and scientific terms used herein have the same meaning as commonly understood by one of ordinary skill in the art to which this invention belongs. The initial definition provided for a group or term herein applies to that group or term throughout the present specification individually or as part of another group, unless otherwise indicated.

The articles "a" and "an" are used herein to refer to one or to more than one (i.e., to at least one) of the grammatical object of the article. By way of example, "an element" means one element or more than one element.

The term "or" is used herein to mean, and is used interchangeably with, the term "and/or," unless context clearly indicates otherwise.

It is to be understood that while the methods and devices have been described in conjunction with the detailed description thereof, the foregoing description is intended to illustrate and not limit the scope of the inventions, which is defined by the scope of the appended claims. Other aspects, advantages, and modifications are within the scope of the following claims.

What is claimed is:

1. A safety cap designed to cover an exterior-facing side of an electrical outlet immediately surrounding contact holes of the electrical outlet, the safety cap comprising:

a non-conductive disk having an interior-facing side for facing the electrical outlet, an exterior-facing side for facing away from the electrical outlet, the interior-facing side of the disk having a sufficient area to cover the exterior-facing side of the electrical outlet;

a plurality of non-conductive prongs protruding away from the interior-facing side of the disk and sized shaped to fit within the contact holes of the electrical outlet; and one or more keyholes on the interior-facing side of the disk, and being sized and shaped to allow a prong-sized projection of a device to be slidably inserted into one of the keyholes between the interior-facing side of the disk and the exterior-facing side of the electrical outlet so that the safety cap can be pulled away from the electrical outlet when the safety cap is inserted into the electrical outlet such that the interior-facing side of the disk is next to the exterior-facing side of the electrical outlet.

2. The safety cap of claim 1, wherein the safety cap is made of an electrically non-conductive material.

3. The safety cap of claim 2, wherein the safety cap is made of one or more materials selected from the group consisting of plastic, rubber, rubber-like polymer, and nylon.

4. The safety cap of claim 1, wherein the safety cap has two and only two prongs.

5. The safety cap of claim 1, wherein the safety cap has three or more prongs.

6. The safety cap of claim 1, wherein a length of a keyhole of the one or more keyholes extends from an outer edge of the interior-facing side of the disk toward the center of the interior-facing side of the disk.

7. The safety cap of claim 1, wherein a region around the prongs is sufficient sized to cover an area immediately surrounding the contact holes.

8. The safety cap of claim 7, wherein the disk is rounded.

9. The safety cap of claim 7, wherein the disk is generally square.

10. The safety cap of claim 1, wherein the safety cap is made of one monolithic piece.

11. The safety cap of claim 1, wherein the safety cap is made of phosphorescent material such that the safety cap emits light when activated by light or heat.

12. The safety cap of claim 1, wherein the safety cap is coated by a phosphorescent material such that the safety cap emits light when activated by light or heat.

13. A method of removing the safety cap as claimed in claim 1 from an electrical outlet, the method comprising: sliding the prong of the device inside a keyhole of the one or more keyholes of the safety cap and pulling the device outward with enough force to release the prongs of the disk from the contact holes.

14. The method of claim 13, wherein the safety cap is made of an electrically non-conductive material.

15. The method of claim 14, wherein the safety cap is made of one or more materials selected from the group consisting of plastic, rubber, rubber-like polymer, and nylon.

16. The method of claim 13, wherein the safety cap has two and only two prongs.

17. The method of claim 13, wherein the safety cap has three or more prongs.

18. The method of claim 13, wherein a length of a keyhole of the one or more keyholes of the safety cap extends from an outer edge of a rear surface of the disk toward the center of the rear surface of the disk.

19. A safety cap consisting essentially of a non-conductive disk having an interior-facing side for facing an electrical outlet, an exterior facing side for facing away from the electrical outlet, a periphery, a plurality of prongs sized and shaped to fit contact holes of the electrical outlet, and one or more channels that extend inwardly from the periphery of the safety cap at the interior-facing side, wherein said safety cap is removable with a prong-sized device slidably inserted into one of the one or more channels.

* * * * *